July 7, 1970 C. G. BERGEY 3,519,961

PULSE PARTITIONER

Filed Oct. 24, 1967 2 Sheets-Sheet 1

INVENTOR
C. G. BERGEY
BY David P. Kelley
ATTORNEY

July 7, 1970 C. G. BERGEY 3,519,961

PULSE PARTITIONER

Filed Oct. 24, 1967 2 Sheets-Sheet 2

United States Patent Office 3,519,961
Patented July 7, 1970

3,519,961
PULSE PARTITIONER
Carl G. Bergey, Reading, Pa., assignor to Bell Telephone Laboratories, Incorporated, Murray Hill, N.J., a corporation of New York
Filed Oct. 24, 1967, Ser. No. 677,678
Int. Cl. H01p *1/10, 3/08, 5/12*
U.S. Cl. 333—7 5 Claims

ABSTRACT OF THE DISCLOSURE

A pulse partitioner comprises a transmission line having quarter wave shorted stubs spaced at half wavelength intervals along the line. The shorts on the stubs are provided by pair of forward-biased diodes mounted between the center and outer conductors of each stub. By selectively reverse-biasing each pair of diodes, the input power pulse can be partitioned into a plurality of shorter pulses each having a duration equal to the time that its associated pair of diodes was reverse-biased, and having a power amplitude equal to that of the input pulse.

BACKGROUND OF THE INVENTION

This invention relates to microwave power switches and more particularly to a pulse partitioner for timewise dividing a long duration, high power pulse into a plurality of shorter duration pulses of the same amplitude.

In many applications, for example RF life testing of diodes, it is desirable to be able to generate a plurality of high power pulses of a particular duration and duty cycle from a single power source. The prior art generally resorts to the use of several high power RF sources each of which generates a high power pulse of the desired duration and duty cycle. The amplitude of the pulse, which is much larger than the desired amplitude, is then power divided into a plurality of pulses of the desired power level by the use of well-known microwave devices such as the hybrid or directional coupler. The disadvantage of such an arrangement is that it requires the use of extremerly high power RF sources which are, of course, quite expensive. Furthermore, prior art problems are compounded by the frequent necessity of using more than one such source. For example, consider an application in which it is desired to RF test 25 pairs of diodes at a peak power of 125 watts using 500 microsecond pulses, thus requiring a source having a minimum power output of 3.125 kilowatts. Commercially available power sources that deliver a 500 microsecond pulse at such high power levels are generally capable of only about 1.8 kilowatt peak output and are priced at approximately $16,000. To provide the minimum 3.125 kilowatts two such power source with duplicate power division circuitry would be required at an expense of the order of $32,000. Thus, because of the large expense involved, it is desirable to be able to generate a plurality of power pulses first of all from a single power source and secondly from a relatively low level power source.

SUMMARY OF THE INVENTION

The present invention employs a technique termed "pulse partitioning" to produce a plurality of high power pulses of a desired amplitude, duration and duty cycle by *timewise* dividing a power pulse from a single low level power source, rather than by *power* dividing power pulses from one or more high level power sources as is customary in the prior art. A pulse partitioner in accordance with the invention is a microwave power switch for timewise dividing a long high power pulse into a plurality of shorted pulses of the same amplitude. The partitioner in one embodiment comprises a transmission line having a plurality of quarter wave shorted stubs spaced at half wavelength intervals along the line. The short on each stub is provided by a pair of forward-biased diodes mounted between the center and outer conductors of that stub, i.e., in a stripline stub each diode has a common terminal connected to the center conductor and their remaining terminals connected separately to opposite outer conductors. By selectively reverse-biasing each pair of diodes, the input power pulse can be partitioned into a plurality of shorter pulses each having a duration equal to the time that its associated pair of diodes was reverse-biased, and having an amplitude equal to that of the input pulse. The maximum number of pulses generated by the partitioner from a single input pulse is equal to the number of quarter wave shorted stubs connected to the transmission line of the partitioner.

Because the present invention does not employ the technique of power dividing a high amplitude power pulse into a plurality of low amplitude power pulses, it is readily possible to employ much lower peak level power sources (e.g., 250 watt peak sources). In one respect the difference between the pulse partitioner and the prior art power dividers is that the pulse partitioner utilizes a single RF power source which generates input pulses of long duration (e.g., 2500 microseconds) and of significantly lower peak lower level (e.g., watts as compared to kilowatts). The long duration input pulse may be timewise divided into a plurality of shorter duration low level pulses (e.g., five 250 watt pulses each of 500 microsecond duration).

BRIEF DESCRIPTION OF THE DRAWINGS

The invention, together with its various features and advantages, can be easily understood from the following more detailed description taken in conjunction with the accompanying drawings, in which.

DETAILED DESCRIPTION

Figure 1:
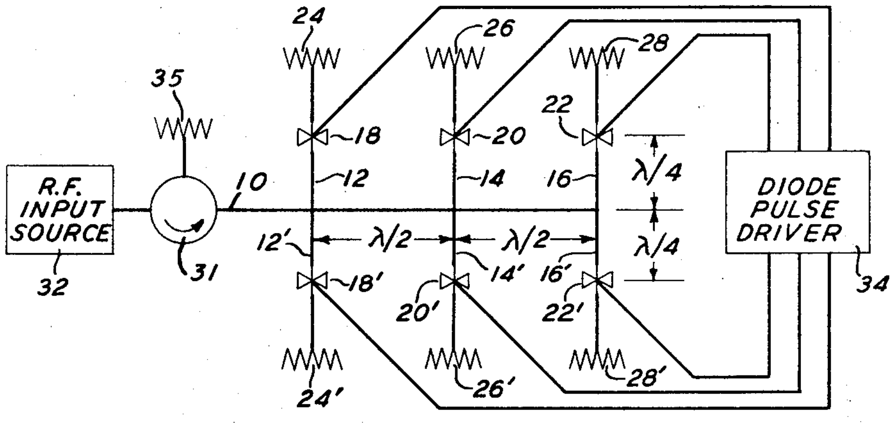
FIG. 1 is a circuit schematic of one embodiment of the invention.

Turning now to FIG. 1, a pulse partitioner comprises a transmission line 10 having quarter wave shorted stubs 12–12′; 14–14′ and 16–16′ spaced at half wavelength intervals along the line 10. The shorts on the stubs are provided by pairs of forward-biased diodes 18–18′, 20–20′ and 22–22′ mounted respectively between the center and outer conductors of each stub 12–12′, 14–14′ and 16–16′. Each such stub is respectively terminated in a load 24–24′, 26–26′ and 28–28′. An RF pulse source 32 is coupled to the input end of transmission line 10 through a circulator 31 which prevents reflected energy from entering the source 32. A diode pulse driver 34 has each of its multiple outputs connected to a separate diode pair. The output of pulse driver 34 may be either a voltage sufficient to reverse-bias each pair of diodes or a current sufficient to forward-bias them.

The operation of the pulse partitioner is briefly as follows. By selectively reverse-biasing each pair of diodes, the input pulse is timewise partitioned into a plurality of shorter pulses, a separate pulse appearing at the output of each stub. Each pulse has a duration equal to the time that its associated diode pair was reverse-biased, and each has a power amplitude equal to that of the input pulse. The maximum number of output pulses which can be generated from a single input pulse is equal to the number of stubs connected to the transmission line 10 provided that the sum of the pulse durations of the output pulses cannot exceed the duration of the input pulse. The maximum number of outputs is further limited by the desired bandwidth. The partitioner bandwidth is decreased by the addition of each output section because each section is effectively a bandpass filter.

Figure 2:
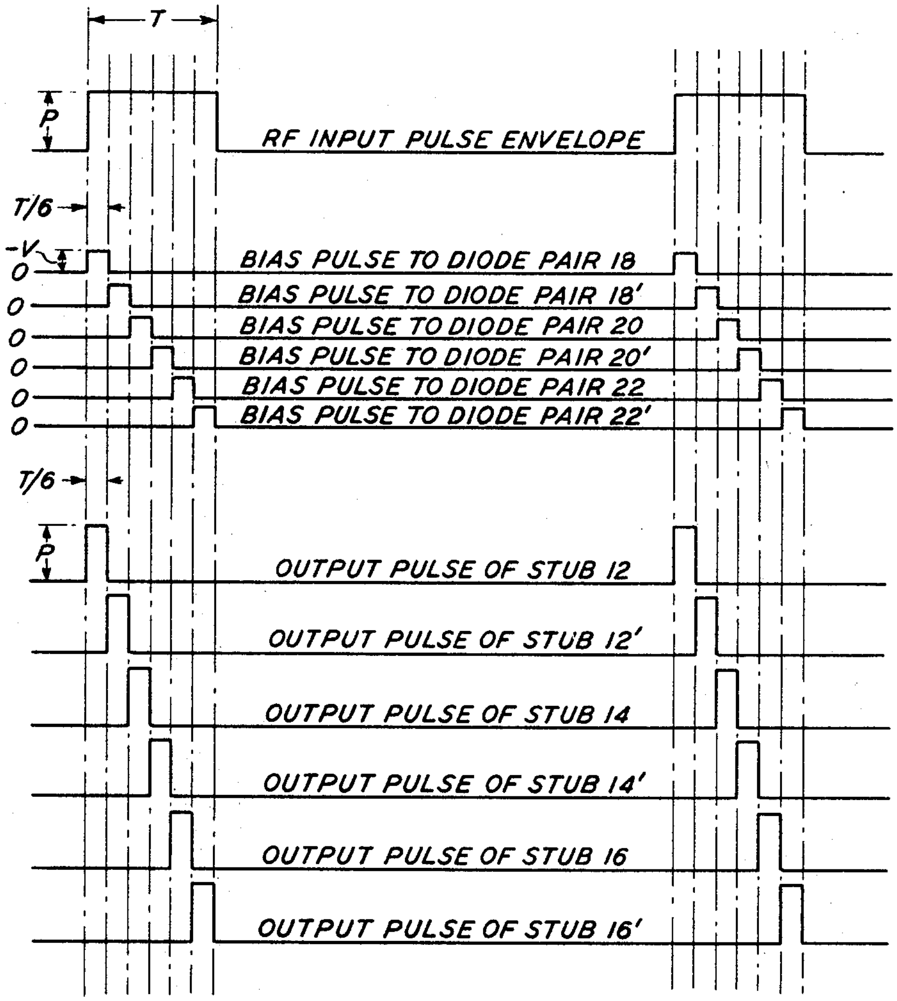
FIG. 2 shows the synchronous biasing pulses used to produce timewise pulse partitioning in accordance with one aspect of the invention.

Consider, for example, the pulse partitioner of FIG. 1 which has six stubs 12–12′, 14–14′ and 16–16′ connected to the transmission line 10. As shown in FIG. 2, an RF pulse of power amplitude P and duration T may be timewise divided into six shorter power pulses each of the same power amplitude P but of shorter duration T/6 by applying sequentially to each diode pair of reverse-bias voltage pulse of duration T/6 and amplitude V. The leading edge of the bias pulse applied to diode pair 18 is synchronized by well-known circuit techniques with the leading edge of the RF input pulse, the leading edge of the bias pulse applied to the diode pair 18′ is synchronized with the trailing edge of the bias pulse applied to diode pair 18 and so forth. At first all diode pairs are forward-biased and therefore each is a short circuit at the diode location but appears as an open circuit one-quarer wavelength away at the transmission line 10. That is, the RF input pulse on the line 10 "sees" an open circuit. When, however, one of the pairs is reverse-biased, that pair is an open circuit at the diode location but appears as a short circuit at the line 10 and therefore power is dissipated in the load terminating the corresponding stub. The other diode pairs, located at odd multiples of a quarter wavelength from that stub, are simultaneously forward-biased and thus appear as open circuits to the RF input pulse. Consequently, no power is dissipated in the loads corresponding to the forward-biased diode pairs. For example, if the diode pair 20 on stub 14 is reverse-biased, power is transmitted into the load 26. All of the other diodes are forward-biased and are therefore RF short circuits. Since the stubs 12–12′ and 14′ are quarter wavelength shorted stubs, each appears as an open circuit to the RF signal. Stubs 16–16′ are quarter wavelength shorted stubs separated from the junction of line 10 and stub 14 by one-half wavelength and thus also appear as open circuits to the RF signal. Other sequences of bias pulses are, of course, readily possible to produce different sequences of output pulses. Furthermore, the duration of the bias pulses may be varied to produce output pulses of different durations.

The plurality of high power output pulses generated has numerous applications including, for example, the life testing of varactor diodes. The varactor diodes would be connected in pairs between the center and outer conductors of each stub, a separate one of the pairs being located between a stub load and the partitioner diode pairs at a point one-half wavelength from the partitioner diode pairs. The varactor diodes would be operated under zero volts D.C. bias and be forward-biased by the output pulses, thus providing a low impedance between the center and outer conductors of the stub. The low impedance between the two conductors would result in reflected power that would be dissipated in the circulator load depicted here by 35. The power transmitted through the varactor diodes would typically be dissipated in fifty ohm loads depicted here by resistors 24–24′, 26–26′ and 28–28′. Other loads are of course feasible.

Figure 3:
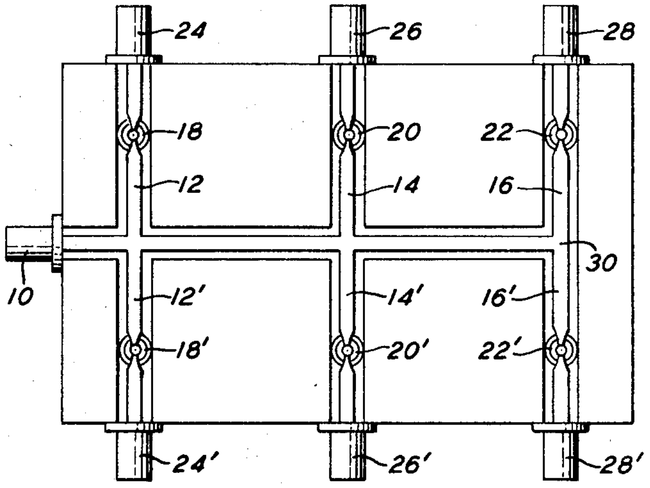
FIG. 3 is a top view of a portion of a pulse partitioner in accordance with one embodiment of the invention.

A pulse partitioner utilizing 50 ohm TEM air dielectric stripline for use at L-band frequencies is shown in FIG. 3, with the pulse source, circulator loads and diode pulse driver omitted. The numerals of FIG. 3 correspond to those of FIG. 1 where appropriate. Only the center conductor (mounted in one of the two outer conductors which are electrically short circuited together by conductive side walls) of the transmission line 10 and the stubs 12–12′, 14–14′ and 16–16′ and the partitioner diodes 18–18′, 20–20′ and 22–22′ are shown. The width of the center conductor of each stub is decreased at each diode location in order to compensate for mismatch due to the reverse-bias diode capacitance. Alternatively, diode capacitance compensation can be achieved by inserting a parallel inductive stub of the proper length at each diode location. The partitioned diodes are typically L–2480 PIN diodes which are capable of withstanding relatively high RF power levels (e.g., hundreds of watts) under these conditions.

The partitioner diodes may be mounted on the stripline by means of well-known diode contactors which include (1) spring loaded mechanical means for holding the diodes in contact with the center conductor, (2) a low pass filter to provide a filtered D.C. biasing path, (3) a current limiting resistor (large relative to the diode forward resistance) to ensure substantially equal currents though each of the forward-biased diodes, and (4) a capacitor that resonates with the forward-biased diode inductance to provide a low impedance RF path between the center conductor and ground.

Figure 4:
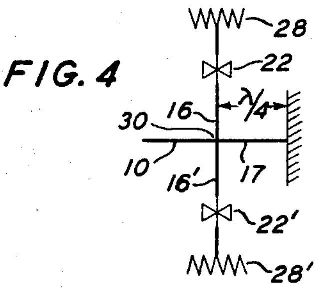
FIG. 4 is a partial circuit schematic of another embodiment of the invention.

The diode contactor allows biasing to one side of each diode, the other side being biased through the center conductor by means of a D.C. return through a short from the center to the outer conductors. This short may be provided by external circuitry to which the outputs are attached, by a circulator having a short circuit on the reflected signal port, by the addition of a quarter wavelength shorted stub 17 at the terminal end 30 of transmission line 10 as shown in FIG. 4, or by any other technique will known in the art. Typically these diodes (i.e., the L–2480 diodes) are operated at 20 volts D.C. reverse-bias and 25 ma. forward-bias.

The RF power absorbed by the partitioner diodes is a function of the bias applied to them. It has been found that increasing the D.C. reverse-bias at a given RF voltage reduces the RF loss of the diodes. Thus, increased bias voltages permit the partitioner to be operated at higher RF power levels. The maximum RF power level at which the pulse partitioner can be safely operated is limited, of course, by the diode reverse breakdown voltage and the design of the pulse driver circuits used.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, the present invention can be readily constructed by those skilled in the art from two conductor RF transmission systems such as coaxial line or single outer conductor stripline, in which case a single diode, rather than diode pairs, may be used between the conductors at the quarter wavelength locations.

What is claimed is:

1. Apparatus for timewise partitioning a pulse signal into a plurality of shorter pulses comprising:

a transmission line for carrying the pulse signal and a terminal end, a plurality of transmission line stubs spaced one-half wavelength apart on said transmission line, a plurality of diodes, each of said diodes being connected across a separate one of said stubs and being located at a point one-quarter wavelength from said transmission line, means for short-circuiting each of said stubs comprising means forward-biasing each of said diodes, and means for sequentially open-circuiting selected ones of said stubs comprising means for sequentially reverse-biasing selected ones of said diodes.

2. The apparatus of claim 1 wherein said transmission line and each of said stubs comprise a stripline having a center conductor and a pair of outer conductors spaced on opposite sides of said center conductor, said diodes each being mounted in pairs between said outer conductors and having a common terminal connected to said center conductor.

3. The apparatus of claim 2 wherein the width of said center conductor is decreased at each diode pair location to compensate for reverse-bias diode capacitance.

4. The apparatus of claim 2 wherein said reverse-biasing means includes means for providing a D.C. return comprising means for short-circuiting said outer conductors to said center conductor, and means for sequentially applying a reverse-bias voltage across selected ones of said diode pairs.

5. The apparatus of claim 4 wherein said D.C. return means comprises a short-circuited quater wavelength stub connected to the terminal end of said transmission line.

References Cited

UNITED STATES PATENTS

| | | | |
|---|---|---|---|
| 2,892,983 | 6/1959 | Larson | 333—13 |
| 3,069,629 | 12/1962 | Wolff | 333—7 XR |
| 3,138,768 | 6/1964 | Evans | 333—97 |
| 3,321,717 | 5/1967 | Harper | 333—7 |
| 3,337,820 | 8/1967 | Harper | 333—7 |

OTHER REFERENCES

"Five New Diode Circuits for Nanosecond Microwave Switching," Ravenhill & Smith, Electronics, Aug. 1, 1962, pp. 37–39.

HERMAN KARL SAALBACH, Primary Examiner

M. NUSSBAUM, Assistant Examiner

U.S. Cl. X.R.

333—84